UNITED STATES PATENT OFFICE.

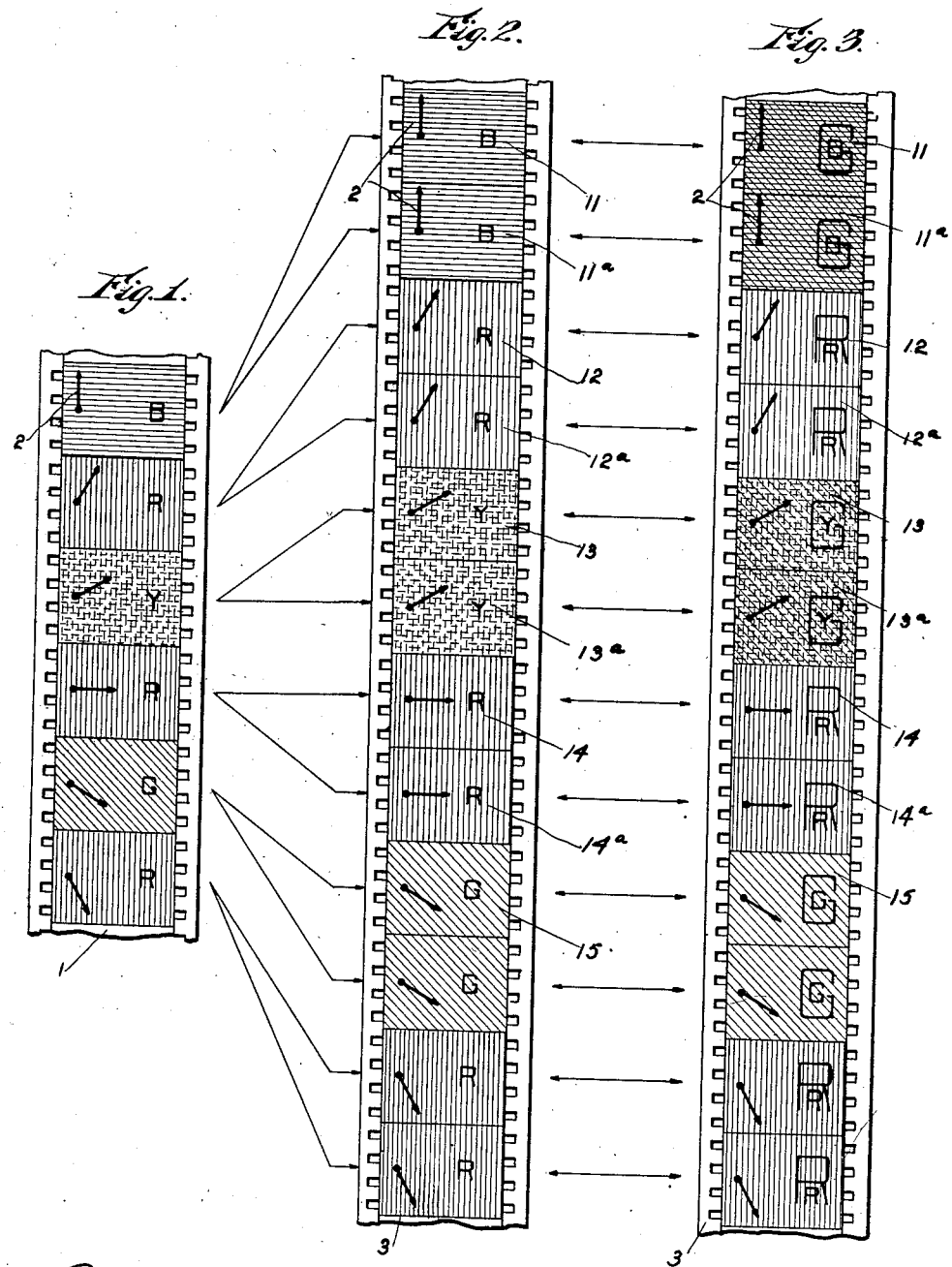

JOSEPH SHAW, OF NEW YORK, N. Y., ASSIGNOR TO RAINBOW PICTURE CORPORATION, OF NEW YORK, N. Y., A CORPORATION OF NEW YORK.

METHOD FOR PRODUCING MOTION PICTURES IN COLORS.

1,402,668.         Specification of Letters Patent.         Patented Jan. 3, 1922.

Application filed February 24, 1919, Serial No. 278,789. Renewed June 16, 1921. Serial No. 478,216.

*To all whom it may concern:*

Be it known that I, JOSEPH SHAW, a citizen of the United States, and a resident of the city of New York, borough of Bronx, in the county of Bronx and State of New York, have invented a new and Improved Method for Producing Motion Pictures in Colors, of which the following is a full, clear, and exact description.

The present invention relates to color motion pictures, and aims to provide an improved method which will produce more perfect color effects upon projection with the least amount of color-light flicker.

I have found in practice of projection of tinted single-coated motion-picture positives that color flicker is very disturbing when slow-speed projection is maintained, especially when an image tinted in one color alternates with an image tinted in a color complementary to it, producing color pulsations and consequent strain upon the eyes of the observer, but that the higher the speed of projection the less disturbing the flicker; and if the speed is exceedingly high, the color flicker substantially disappears, causing no eye strain.

It will be clear to one skilled in the art that it is not practicable nor advisable to take the color separated negative film records at a sufficiently high rate of speed to meet the requirements of high-speed positive projection, for the reason that the negative panchromatic film is not sufficiently sensitive to allow such high-speed exposure, especially when dense color filters are employed. For obvious reasons, also, it is not generally practicable to take the negative record at slow speed and project a color selective tinted projection positive made therefrom at a relatively rapid speed on account of the abnormal effect upon the phases of action of the scene. The term "projection positive" is herein used in a broad sense as designating the projection strip without regard to its specific character.

In explanation of the facts, the theory is advanced that at slow speed the duration of the projection and thereafter the interval between projections are sufficient to permit an independent sense impression of each successive color and conscious perception of change of color, wherefore the observer becomes conscious of an alternation of color or light flicker, whereas, at high speed the changes from one color image to another take place more quickly, and the duration of each projection and the interval between the successive projections are together too short to permit conscious sensing or perception of the separate colors or consciousness of the change of color; but due to the shortness of the period between projections, the two colors are entirely and instantaneously merged; the persistency of vision completing the color-rendering.

The phrase "period between projections" is used herein to define the time between the beginning of one picture projection and the beginning of the next succeeding picture projection; and the phrase "interval between projections," to define the time between the end of one picture projection and the beginning of the next.

The present invention, aiming to obtain both certain advantages afforded by relatively slow exposure and certain advantages afforded by relatively rapid projection, provides a method in accordance with which the period between successive projections of complementary colors is shortened, therefore facilitating the instantaneous blending of differently colored images in conscious perception through the phenomenon of persistence of vision while retaining the normal phase of action.

To be able to project the positive at very high speed without accelerating the normal phases of action, I produce a positive film of double the length of the negative film from which it is printed by duplicating in printing each individual negative image area representing a phase of action into each of two adjoining or adjacent successive image areas of the positive.

It is found in practice that the duplicated phases of action are synchronized in the eye and remain normal when the images representing these phases are projected at approximately double the speed at which the negative film was exposed.

For facilitating explanation and disclosure of the invention, one selected illustrative method for accomplishing the ends sought will be explained, reference being made to the accompanying drawings forming a part hereof, and in which,—

Figure 1 is a plan view of a negative showing six successive picture fields constituting a complete group of color-separated records;

Fig. 2 is a similar view of a positive printed therefrom, each picture field of the negative being imprinted in each of two successive picture fields of the positive; and Fig. 3 is a similar view of the same positive as that shown in Fig. 2 but after the same has been colored in red and green tints.

The negative 1 is made with the aid of and exposed through six color filters in rotation, comprising three color filters of short-wave length alternating with three color filters of long-wave length. The color filters of short-wave length are of blue, yellow, and green colors respectively, and the three color filters of long-wave length are of a red color only, so arranged that each of the three red color filters with an adjacent blue, yellow or green color filter forms a pair.

This method of taking to provide a series of six color-separated records is in accordance with the invention set forth in my prior Patent, No. 1,289,940.

The initial letters of these colors are applied to the respective image areas in the drawings in small capitals to indicate the color-separated value of each, and arrows 2, 2 in clockwise progressive positions indicate the successive phases of action recorded in successive image areas. The color separation is also indicated by shade lines, the different colors being indicated by shaded lines of different character, as is customary in the indication of colors. The same letters and arrows together with the same shade lines are used in Figs. 2 and 3 with the same significance.

The positive 3, shown in Fig. 2, is printed from the negative 1 by printing each image into each of two successive image areas of said positive. The positive, therefore, is of double the length of the negative from which it is printed; and each image is reproduced twice in adjoining image areas, thus producing a pair of adjoining twin records. The printing of such a positive film may be accomplished by a printing machine which moves the positive film two picture sections for each picture-section movement of the negative film.

The positive can subsequently be tinted directly, dyed or toned photographically in such a manner that the picture image sections of red color selection will have a red color tint, and the picture image sections of blue, yellow and green color selection respectively will each have a green color tint. The intensity of the several tints of red or green may be varied and other color tints introduced, as found necessary or desirable.

In Fig. 3 the positive 3 is shown as tinted in red and green alternately. The color separated images of long-wave color selection are tinted in red, and the color separated images of short-wave color selection are tinted in green. In Fig. 3 the arrows representing successive phases of action, the small caps and shade lines representing color selective value, are reproduced; and large capital initials representing the tints applied, together with the corresponding shading for such colors, are superimposed over the small capitals and the shading which indicates color selective value.

The positive shown is tinted in accordance with the principle set forth in my aforesaid patent, to wit, all images of long-wave color separated value are tinted red, and all images of short wave separated value are tinted in green; accordingly, the images are tinted in pairs, alternately two green and two red, whether or not the two green and the two red tints are in each case of the same or varying intensity. The projecting positive 3 may be considered as a strip presenting pairs of repeat or twin image areas 11, 11$^a$; 12, 12$^a$; 13, 13$^a$, etc., or, it may be considered as presenting pairs of complementary colored image areas 11$^a$, 12; 12$^a$, 13; 13$^a$, 14; etc., in which the two successive image areas of each paid depict successive phases of motion.

If it is desirable to obtain a final color projection positive by bleaching and developing the images into colors by dyes, an intermediate "positive printer" can be made. The intermediate steps of making and using this positive printer may necessitate a reversal of the order of the colors in respect to the above-mentioned color selections. I prefer to use the manipulations in tinting carried out by the method forming the subject matter of the patent to myself and Berwick, No. 1,287,594, granted December 10, 1918.

The positive 3 bearing these complementary color tints is projected at approximately double the speed at which the original negative was exposed. For example, if the original negative was taken at a rate of twenty-five exposures per second, the projecting positive will be projected at the rate of fifty exposures per second. The effect produced will be to render upon the eye of the observer a more complete effect of natural colors of the object or scene by greatly reducing the optically sensible color-light flicker by accelerating the changes between the complementary colors, thereby causing a more continuous merging of the colors, the smoothness of which is made possible by the rapid projection without changing the normal action of the moving object.

The factor of short duration of the interval between changes of the separate colors offers another advantage in respect to better color rendering by the possibility of introducing to the eye a very minute period of color sensation of either pure blue or yellow color obtained by tinting, for instance, one picture of short-wave length color section in every duplicated group of twelve picture sections into either of blue or yellow color tint; although either of these tints will repeat only in every twelfth projection, yet when overlapped with the successive red and green tints of the same group, it will add to the true color rendering of the object.

The above description of the preferred method is to be understood as illustrative rather than restrictive. This principle as described can be applied with advantage to other taking methods than used in the illustration, and variations may be made without exceeding the scope of the invention as set forth in the claims.

The projecting positive may contain repeated pairs, comprising for instance, two successive phases of action of long and short-wave color selective value respectively, for example: red, green; red, green; etc. In such a projecting positive, pairs of images of the original negative would be repeated, instead of individual image areas being repeated in the positive.

Obviously, the phases of action would not occur in exact sequence. Whether satisfactory results would be obtained by such a projecting positive would depend largely upon the speed of action of the scene.

Having thus described my invention, I claim as new and desire to secure by Letters Patent:

1. A projecting positive for projecting motion pictures in color, having successive pairs of color separated images recording successive phases of action, the two images of each pair being duplicates and being of one and the same color separation and recording the same phase of action in successive adjoining image areas.

2. A photographic strip carrying color selected records of alternating twin images of red, and twin images of green color tints, both of the two images of each of the said twin pairs being duplicates and of the same color selection and representing one and the same phase of action.

3. A photographic strip carrying color separated records of alternating twin images of long wave and twin images of short wave separated value, both of the two images of each said twin being duplicates and of the same color separation and representing one and the same phase of action.

4. In the art of color motion pictures, the step for producing color-projection positives for rapid projection without accelerating the normal phase of action, which consists in providing on a positive film double the number of color separated image areas of a negative film by imprinting each color selected image of the negative film into each of two adjoining image areas of the positive film.

5. A positive record for use in producing motion pictures in colors, comprising image areas in pairs; each of said pairs consisting of two adjoining image areas having color selected records presenting one and the same phase of action and the two images bearing the same color tint; the two adjoining image areas of the successive pairs also presenting one and same but the next successive phase of action and bearing a color tint complementary to the preceding pair.

6. A positive record for use in projecting motion pictures, comprising image areas in pairs, each pair consisting of two adjacent image areas having color-selected records presenting the same phase of action and each bearing a tint of the same color, the image areas of alternate pairs bearing tints of long-wave length and the intermediate pairs bearing tints of short-wave length.

7. The method of producing motion pictures in colors, which includes recording on a negative film color selected images in successive groups of six, three of each six being selective of colors of short-wave lengths, and three being selective of colors of long-wave lengths; printing a positive film in which each image of the first film is duplicated by being printed in each of two adjoining image areas of the positive and applying to the image areas of short-wave length selection tints of green color, and applying to image areas of long-wave length selection tints of red color whereby the positive film may be projected at twice the speed at which the negative records were taken without accelerating the normal phases of action.

8. The method of producing motion pictures in colors, which includes recording on a negative film color selected images in successive groups of six, three of each six being selective of colors of short-wave lengths, and three being selective of colors of long-wave lengths, and printing a positive film in which each image of the first film is duplicated by being printed in each of two adjoining image areas of the positive, applying to the image areas of short-wave length selection one color tint and to the image areas of long-wave length selection a complementary color tint, whereby the positive film may be projected at twice the speed at which the negative records were taken without accelerating the normal phases of action.

9. A photographic positive projecting record having color separated successive images; each two adjoining successive images of the same wave length being a duplicate of the one and same phase of action; every alternating two adjoining successive color separated image areas being of short-wave length, and every intermediate two adjoining successive image areas being of long-wave length, the image areas of short-wave length bearing one color tint and the image areas of long-wave length bearing a complementary color tint.

10. The method of producing motion pictures in color, comprising obtaining a negative through filters to record images alternately of long and short-wave color separated value, and printing a positive therefrom by duplicating in printing each successive image area of said negative record into each of two successive adjoining image areas of the positive, and projecting the positive at double the speed the negative was obtained.

11. A positive record for use in projecting motion pictures in color, comprising image areas in alternating pairs, both image areas of each pair presenting the same phase of action and bearing a tint of the same color; and successive pairs of image areas bearing tints of complementary colors and presenting the next successive phases of action.

12. The method of producing motion pictures in color, comprising as a step, duplicating in printing each image area of the negative record into each of two adjoining successive image areas of the positive.

13. A photographic strip carrying color separated positive records of image areas in alternating pairs of red and green color tints; each two adjoining successive pairs are duplicates representing the phases of action of only one successive pair of a color separated negative film.

JOSEPH SHAW.